INVENTORS
Seymour Rosin
Charles D. Bryant
BY Michael S. Striker
Attorney

July 19, 1966   S. ROSIN ETAL   3,261,967
DIMENSION MEASURING ARRANGEMENT
Filed Sept. 5, 1961   9 Sheets-Sheet 5

INVENTORS
Seymour Rosin
Charles D. Bryant
BY
Michael S. Striker
Attorney

July 19, 1966  S. ROSIN ET AL  3,261,967
DIMENSION MEASURING ARRANGEMENT
Filed Sept. 5, 1961  9 Sheets-Sheet 6

INVENTORS
Seymour Rosin
Charles D. Bryant
BY
Richard S. Striker
Attorney

July 19, 1966 S. ROSIN ETAL 3,261,967
DIMENSION MEASURING ARRANGEMENT
Filed Sept. 5, 1961 9 Sheets-Sheet 8

INVENTORS
Seymour Rosin
Charles D. Bryant
BY
Michael S. Striker
Attorney

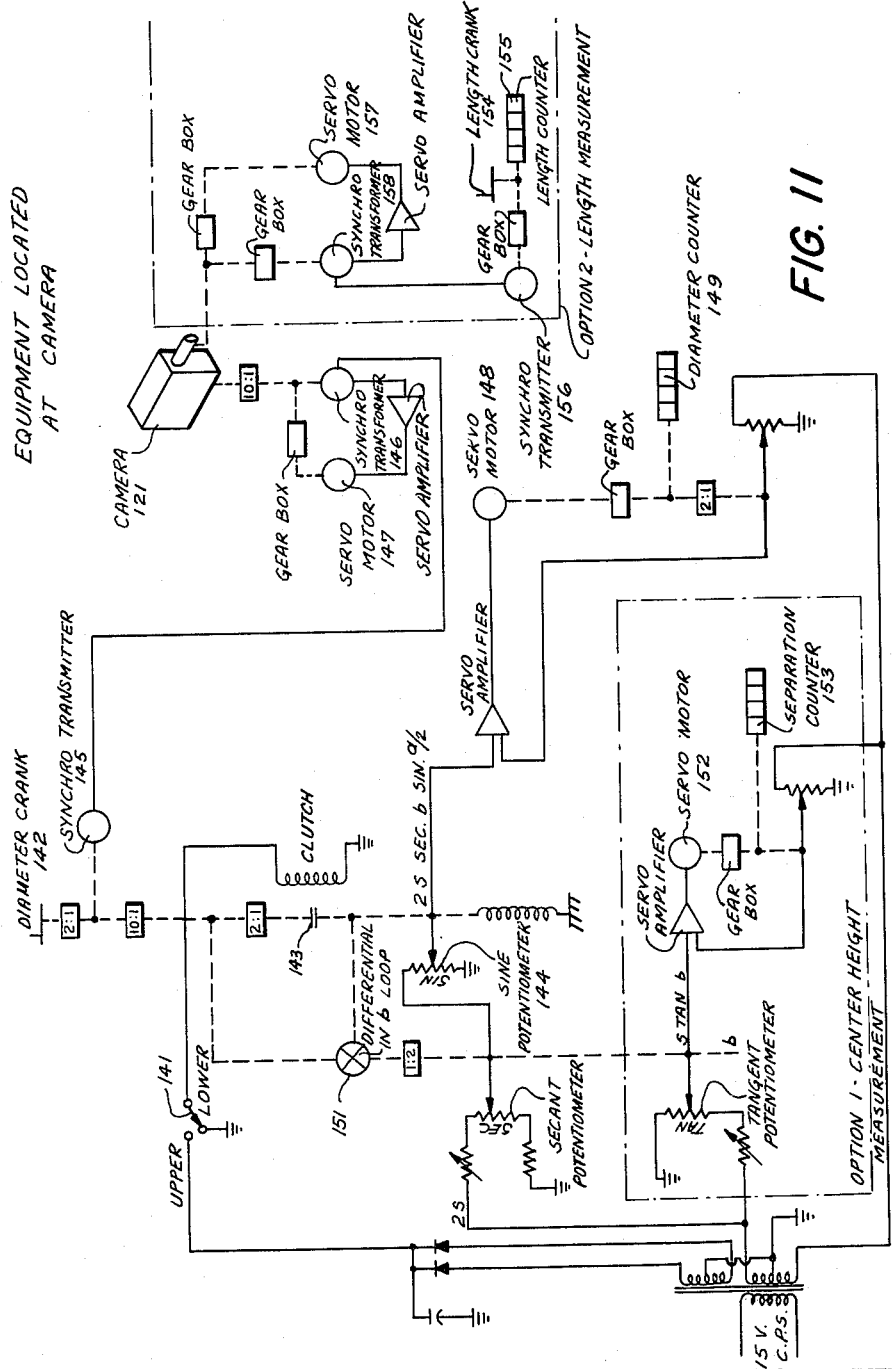

United States Patent Office 3,261,967
Patented July 19, 1966

3,261,967
DIMENSION MEASURING ARRANGEMENT
Seymour Rosin, Massapequa Park, and Charles D. Bryant, Brooklyn, N.Y., assignors to Uniscan Electronics Corporation, a corporation of New York
Filed Sept. 5, 1961, Ser. No. 136,079
6 Claims. (Cl. 235—151)

The present invention relates to a dimension measuring arrangement. More particularly, the invention relates to a dimension measuring arrangement for measuring any selected distance along a selected dimension of an object from a reference point in the selected dimension.

The principal object of the present invention is to provide a dimension measuring arrangement of accuracy and reliability.

An object of the present invention is to provide a dimension measuring arrangement for measuring any selected distance along a selected dimension of an object from a reference point in the selected dimension with accuracy and reliability.

An object of the present invention is to provide a dimension measuring arrangement for measuring any selected distance along a selected dimension of an object from a reference point in the selected dimension and for automatically controlling an operation on the object with accuracy and reliability.

An object of the present invention is to provide a dimension measuring arrangement for measuring the diameter of an object having an arcuate surface and a circular cross-section formed by the arcuate surface with accuracy and reliability.

An object of the present invention is to provide a method for measuring a dimension with accuracy and reliability.

An object of the present invention is to provide a method for measuring any selected distance along a selected dimension of an object from a reference point in the selected dimension with accuracy and reliability.

Another object of the present invention is to provide a method for measuring any selected distance along a selected dimension of an object from a reference point in the selected dimension and for automatically controlling an operation on the object with accuracy and reliability.

Still another object of the present invention is to provide a method for measuring the diameter of an object having an arcuate surface and a circular cross-section formed by the arcuate surface with accuracy and reliability.

In accordance with the present invention, a preferred embodiment of a dimension measuring arrangement for measuring any selected distance along a selected dimension of an object from a reference point in the selected dimension comprises a television camera positioned in operative proximity to the object. A television monitor arrangement is connected to the camera and is adapted to provide a visual indication of an object seen by the camera. Moving means provides in the camera, and thereby in the monitor, a moving image of the object along the selected dimension of the object from the reference point of the object. Indicating means provides an indication of the distance travelled by the moving image of the object along the selected dimension of the object from the reference point of the object thereby indicating any selected distance along the selected dimension of the object from the reference point.

In accordance with the present invention, an embodiment of the method for measuring any selected distance along a selected dimension of an object from a reference point in the selected dimension comprises the steps of positioning a television camera in operative proximity to the object; connecting a television monitor to the camera and adapting it to provide a visual indication of an object seen by the camera; providing in the camera, and thereby in the monitor, a moving image of the object along the selected dimension of the object from the reference point of the object; and providing an indication of the distance travelled by the moving image of the object along the selected dimension of the object from the reference point of the object thereby indicating any selected distance along the selected dimension of the object from the reference point.

In order that the present invention may be readily carried into effect it will now be described with reference to the accompanying drawings, wherein:

FIG. 11 is a schematic circuit diagram of an embodiment of a camera control arrangement which may be utilized with the embodiment of FIG. 10.

Figure 1:
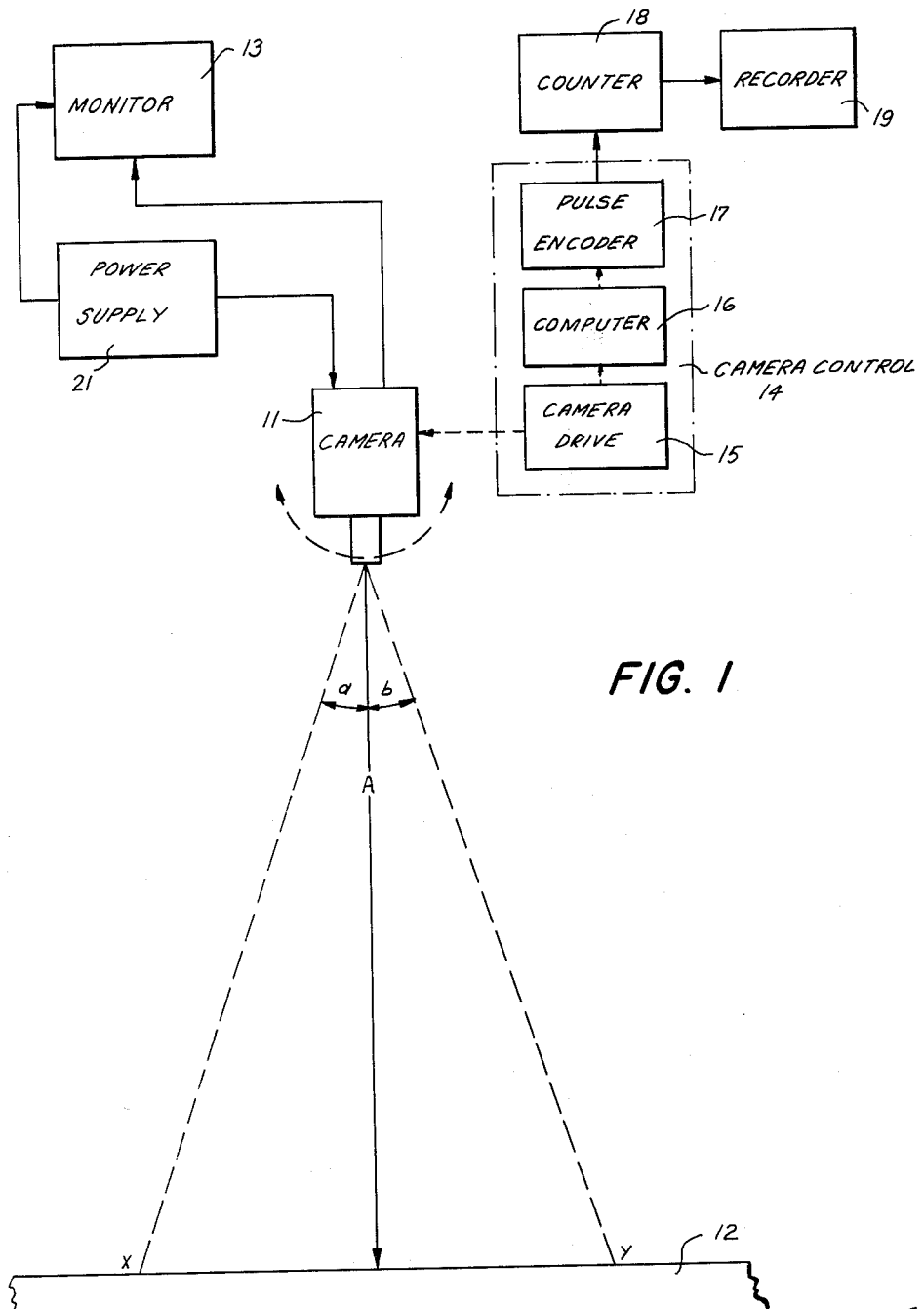
FIG. 1 is a schematic block diagram of an embodiment of the dimension measuring arrangement of the present invention.

In FIG. 1, a television camera 11 is positioned in operative proximity to an object 12. The television camera 11 may comprise any suitable type of television camera known in the art and is mounted for pivotal movement about a fixed pivot point (shown in FIG. 2). The object 12 is to be measured along a selected dimension thereof, such as, for example, length, width or height; the measuring arrangement of the embodiment of FIG. 1 being adapted to measure any selected distance along a selected dimension of the object 12 from a reference point in the selected dimension, which reference point may, and preferably does, comprise, for example, an end of the object in the selected dimension. Thus, the arrangement of the FIG. 1 is adapted to measure a selected dimension such as, for example, the length or the width of the object 12.

The object 12 may comprise hot steel or iron or other metal, having a form or shape such as a beam or a sheet, and which is too hot or of such great radioactivity as to make it dangerous for a human to get too close to it but which may readily be seen by the telescopic lens of the television camera 11. The nature of the object 12 may be such as to make it damaging to radiation or heat sensitive equipment in proximity to it.

The object 12 may comprise a hot steel I beam on a roller bed during a shearing operation, for example.

A television monitor 13 is electrically connected to the camera 11. The monitor 13 is of any suitable type known in the art which functions to provide a visual indication of an object seen by the camera 11, so that a picture of the object 12 will be seen on the viewing screen of the monitor 13. A suitable television monitor may comprise, for example, that manufactured by the Miratel Corporation of Minneapolis, Minnesota, as the model K59/21. The television camera 11 is rotated about the fixed pivot point by a camera control 14 in a manner whereby said camera scans the object 12 along a selected dimension of the object from a reference point in the selected dimension of the object. The camera control 14 includes a camera drive 15 which rotates the camera about the fixed pivot point to scan the object 12 along the selected dimension and a transducer or computer 16 which is mechanically coupled to said camera drive and which functions to convert the mechanical rotation of the camera to an output signal which is directly proportional at any instant to the linear distance of the selected dimension of the object measured from the reference point. A pulse encoder 17 is mechanically coupled to the output of the computer 16 of the camera control 14 and translates the output of said computer to pulses which are directly proportional to the linear distance of the selected dimension of the object from the reference point of the object.

A counter 18 is connected to the output of the pulse encoder 17 and represents or indicates the output signal of said pulse encoder as the magnitude of the linear distance of the selected dimension of the object from the reference point of the object. A recorder 19 is connected to the output of the counter and provides a record of the distance indication represented or indicated by the counter 18. A power supply 21 of any suitable known type is electrically connected to the television monitor 13 and to the television camera 11 to energize said monitor and said camera.

Each of the counters 18 and the recorder 19 may comprise any suitable arrangement known in the art. A suitable embodiment of camera drive 15, computer 16 and pulse encoder 17 is that shown in FIG. 2. The pulse encoder 17 and the counter 18 may be combined into a single unit, such as that manufactured by the Dynapar Corporation of Skokie, Illinois, as Rotopulser-Counter model No. 82.

In operation, the embodiment of FIG. 1 provides a measurement of a selected dimension of the object 12 such as, for example, the length thereof. The television camera 11 is rotated about the fixed pivot point by the camera drive 15 until the image of the object 12 at the reference point in the dimension of length is lined up or coincident with a vertical reference line or hairline provided on the viewing screen of the monitor 13. The reference point may comprise, for example, an end of the object 12 or may merely be a premarked point or other suitably identified point on said object.

The computer 16, which is coupled to the camera drive 15 and to the pulse encoder 17, provides through said pulse encoder a series of pulses corresponding to A (tangent $a$+tangent $b$) when the camera is rotated to scan along the length of the object from the reference point $x$ to a second reference point $y$ in said length of said object; A being the distance between the camera 11 and the object 12, $a$ being the angle between the distance line A and the light line from the camera to the reference point $x$ and $b$ being the angle between the distance line A and the light line from the camera to the reference point $y$. The series of pulses produced by the pulse encoder 17 is thus directly proportional to the distance between the reference points $x$ and $y$ in the length dimension of the object 12. Where recording of the visual indication of the length dimension is desired, the recorder 19 may be utilized.

The operation of the dimension measuring arrangement of FIG. 1 may be summarized briefly as follows. The counter 18 is initially set at zero. The camera 11 is directed to view an end or other clearly defined reference point, $x$ or $y$, in the selected dimension, such as length, of the object 12. The camera drive 15 is actuated to direct the camera 11 in scanning manner along the length defined by $x$ and $y$ of the object 12. During this time, the monitor 13 shows on its viewing screen a moving image of the object 12. At the other reference point, $y$ or $x$, of the object, that is, when such other reference point is aligned with the hairline provided on the monitor screen, the camera drive 15 is stopped. At that point the counter 18 and/or recorder 19 indicates the length of the object 12 between the reference points $x$ and $y$. The counter 18 is then reset to zero to enable it to perform the next following measurement.

If the aforedescribed procedure is followed without stopping at the second reference point, that is, if the camera 11 is rotated to scan the length of the object 12 from an initial reference point in the length dimension, such as, for example $x$, and is continued in scanning manner to direct its view along the length of the object 12, for example, in the direction from $x$ to $y$, at any point at which the camera drive 15 is stopped the counter 18 will indicate the length of said object from the initial starting reference point $x$ to the point at which the camera is directing its view upon stopping of said camera drive. Thus, the dimension measuring arrangement of the present invention may be utilized to measure any selected distance along a selected dimension of the object 12 from a reference point in the selected dimension. It is obvious that such a measurement may be utilized for a control function as indicated in the description of the operation of FIG. 5.

The dimension measuring arrangement of the embodiment of FIG. 1 may of course be utilized to indicate the magnitude of a preselected or predetermined selected dimension of the object 12, such as, for example, a fixed or predetermined length thereof (e.g., the distance $x-y$). In such a case combined with a desired operation such as cutting, or other operation, to be performed in the specified length of the object, the camera 11 may be held in fixed position after it is initially directed to view a point which is the selected distance from the initial reference point which may comprise the end of the object. Thus, if, for example, a length of 36 feet is desired to be indicated on and cut off the object 12, the camera 11 is initially moved to indicate a distance 36 feet from the reference point $x$. Then the object 12 is moved, such as for example, is normal procedure in a rolling mill or other type of conveyor operation. When the reference point $x$, such as the end of the object, which has been previously indicated at 36 feet from the initial point of direction of view of the camera, is aligned with the hairline on the monitor 13, the counter 18 will indicate that the 36-foot length dimension has been reached and the cutting operation or other operation may then be made to take place.

During the course of the operation of the dimension measuring arrangement of the present invention, the television monitor 13 indicates on its viewing screen a moving image of the object 12, commencing with the reference point $x$ or $y$ which is first aligned with the reference line or hairline on the monitor screen. Thus, the operator views the moving image of the object 12 continuously during the operation of the arrangement of the present invention.

Figure 2:
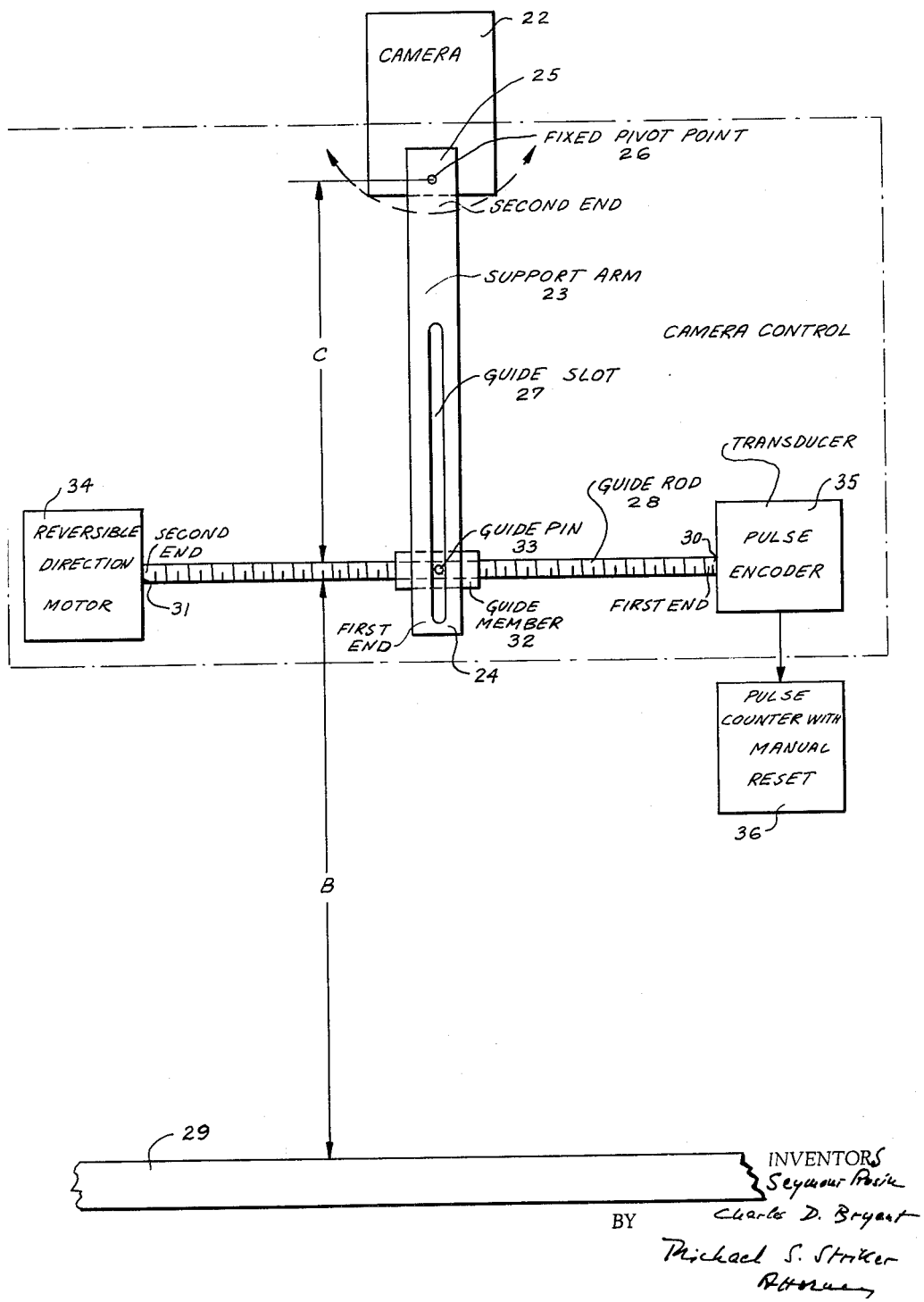
FIG. 2 is a schematic block diagram of an embodiment of a camera control which may be utilized with the embodiment of FIG. 1.

FIG. 2 is an embodiment of a camera control which may be utilized with the embodiment of the dimension measuring arrangement of FIG. 1. In FIG. 2, a television camera 22 is affixed to a support arm 23. The support arm 23 has a first end 24 and a second end 25, the camera 22 being affixed to said support arm in the area of said second end thereof. The support arm 23 is mounted in the area of its second end 25 for pivotal movement about a fixed pivot point 26. A guide slot 27 is formed in the support arm 23 in the area of the first end 24 thereof and extends longitudinally of said support arm. Thus, any force directed in a transverse direction to the support arm 23 in the area of the first end 24 thereof will provide a pivotal or rotational movement of said arm about the fixed pivot point 26 and will accordingly rotate or pivot the camera 22 about said fixed pivot point.

A guide rod 28 is positioned in spaced relation to an object 29, and has a longitudinally extending axis therethrough, a threaded surface, a first end 29 and a second end 31. The guide rod 28 cooperates with a guide member 32 which is coaxially mounted on said guide rod in threaded engagement therewith in a manner whereby rotation of said guide rod about its axis moves said guide member in an axial direction of said guide rod. The guide member 32 preferably comprises a sleeve-like or cylindrical member which is threaded along its inner diameter in a manner whereby it threadedly cooperates with the threads of the outer surface of the guide rod 28. A guide pin 33 is affixed to and extends from the guide member 32. The guide pin 33 extends from the guide member 32 in a substantially radial direction and extends through the guide slot 27 of the support arm 23 in such a manner that rotation of the guide rod 28 about its axis provides movement of the guide member 32 in the axial direction of said guide rod. Movement of the guide member 32 in an axial direction provides, through the guide pin 33 and the guide slot 27 with which it cooperates, a force in a transverse direction upon the area of the first end 24 of the support arm 23 and thereby causes pivotal or rotational movement of said support arm about the fixed pivot point 26. A reversible direction motor 34 is coupled in driving relationship to the guide rod 28 at the second end 31 thereof and functions to drive or rotate said guide rod about its axis in either direction, clockwise or counterclockwise as required. A transducer or pulse encoder 35 is coupled to the guide rod 28 in the area of the first end 29 thereof and functions to convert each mechanical revolution of the guide rod 28 into an electrical pulse in a manner well known in the art. The pulses produced by the pulse encoder 35 are then fed to a pulse counter 36 which indicates the number of such pulses.

The pulse encoder or transducer 35 may comprise, for example, a toothed gear coaxially affixed to the first end 29 of the guide rod 28 and a proximity pickup in operative proximity with the gear which counts the teeth as they pass it, so that the proximity pickup provides an output which is indicative of the number of revolutions of said guide rod. Thus, the pulses received by the counter 36 are proportional to the number of revolutions of the guide rod 28. The counter 36 is a standard type of counter known in the art and includes a manual reset so that it may reset to zero upon completion of one operation to enable the arrangement to continue to the following operation without difficulty.

When the reversible direction motor 34 rotates the guide rod 28, the guide member 32 moves in an axial direction of said guide rod and the guide pin 33 moves the support arm 23 about the fixed pivot point 26. The camera 22 is thus rotated about the fixed pivot point 26 in scanning manner along the selected dimension of the object 29 from a reference point of said object. The counter 36 counts the electrical pulses produced by the transducer 35 and thereby indicates a value proportional to the number of revolutions of the guide rod 28, which is therefore proportional to the distance travelled by the guide member 32. The distance travelled by the guide member 32 is directly proportional at any instant to the linear distance of the image of the object along the selected dimension of the object from the reference point of the object, and is therefore proportional at any instant to the linear distance of the selected dimension of the object from the reference point of the object. Thus, for example, if the length of the object 29 is measured, the distance of travel of the guide member 32 is directly proportional to the length of said object from a first initial reference point which is indicated on the viewing screen of the monitor, and said distance of travel of said guide member, and therefore the length of said object, is indicated by the transducer 32 and represented by the counter 36.

The length of the object 29 from a first reference point thereon is the length moved by the guide member 32 along the guide rod 28 times the perpendicular distance B from said guide rod to said object divided by the perpendicular distance C from said guide rod to the fixed pivot point 26. The transducer 35, as mentioned, may comprise a toothed gear coaxially affixed to the guide rod 28 at the first end 29 thereof. This gear has a number of teeth and a set number of teeth pass by the proximity pick-up during each revolution. If the number of teeth of said gear per revolution of the guide rod 28 is equal to B/C then the counter 36 indicates the length of the object 29 directly. The proximity pick-up may comprise any suitable proximity pick-up known in the art, such as, for example, one which varies a capacitance in accordance with the number of teeth passing it. The proximity pick-up may utilize an oscillator to provide a signal which is electrically varied in accordance with the number of gear teeth passing it. The oscillator is in effect a pulse generator, the number of pulses produced by such pulse generator corresponding to the number of teeth passing said proximity pick-up. Of course, any suitable means for indicating the number of revolutions of the guide rod 28 may be utilized in the embodiment of FIG. 1 of the present invention and in an embodiment of FIG. 2 of the present invention such as, for example, means for merely closing a circuit each time a single gear tooth passes the proximity pick-up to indicate the completion of one revolution of said guide rod thereby producing a pulse so that a single pulse is produced with each revolution. This, however, is not practical, due to maintenance, noise and other efficiency considerations. A suitable proximity pickup may comprise, for example, that manufactured by the Electro Products Laboratories of Chicago, Illinois as Proximity Pickup model 4910–AN and High Sensitivity Proximity Control Unit model 4903–JIC.

Figure 3:
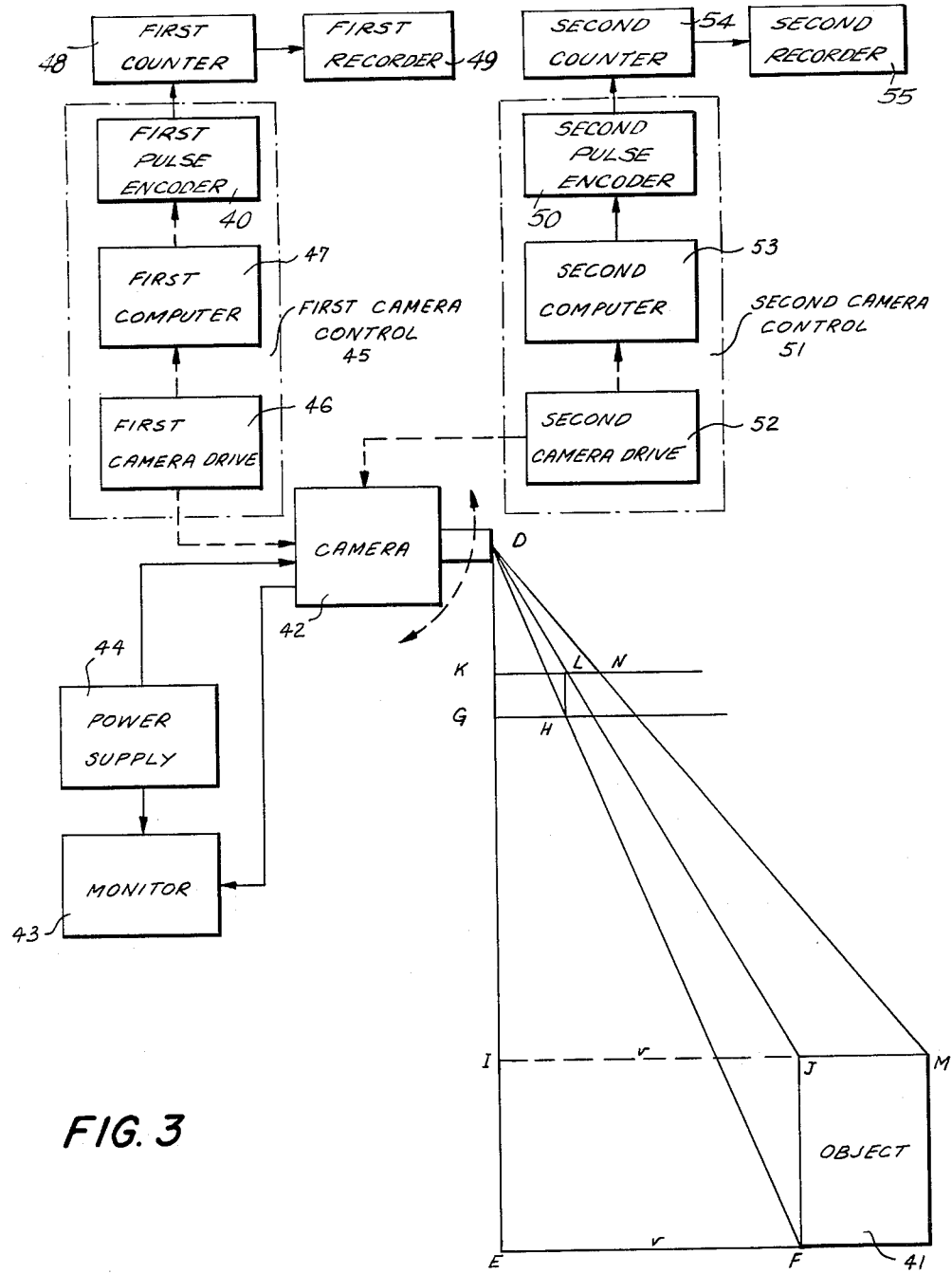
FIG. 3 is a schematic block diagram of a modification of the embodiment of FIG. 1.

FIG. 3 is a modification of the embodiment of FIG. 1 of the present invention. In FIG. 3, the dimension measuring arrangement of FIG. 1 is expanded to cover two dimensions, rather than a single dimension, of an object 41. Thus, for example, if both the height and the width of the object 41 are to be measured, the arrangement of FIG. 3 may be utilized to provide such measurements. The arrangement of FIG. 3 comprises in effect the combination of two arrangements, such arrangement being that of FIG. 1. Thus, a camera 42 is positioned in operative proximity to the object 41 and provides an indication of the image of said object which moves in a predetermined direction across the viewing screen of a monitor 43 which is connected to said camera. The camera 42 and the monitor 43 are energized by a power supply 44. The camera 42 is driven by a first camera control 45 which comprises a first camera drive 46, a first computer 47 coupled to said first camera drive and a first pulse encoder 40 coupled to the first computer 47. A first counter 48 is connected to the output of the first pulse encoder and a first recorder 49 is connected to the output of the first counter 48.

The camera 42 is also driven by a second camera control 51 which comprises a second camera drive 52, a second computer 53 coupled to said second camera drive and a second pulse encoder 50 coupled to the second computer 53. A second counter 54 is connected to the output of the second pulse encoder and a second recorder 55 is connected to the output of the second counter 54. Each of the arrangements 42, 43, 44, 45, 46, 47, 48, 49 and 42, 43, 44, 51, 52, 53, 54, 55 operates in the manner described with reference to the arrangement of FIG. 1. The object 41 may comprise a large girder or ingot on a roller table in a steel mill for example.

The following mathematical relations apply insofar as the operation of the arrangement of FIG. 3 is concerned.

In the triangle DEF, $v = $ GH times DE/DG.

In the triangle DIJ, $v = $ KL times DI/DK.

Since, GH equals KL, DI/DK equals DE/DG.

In each of triangles FJD and HLD, the height FJ, equals HL times DE/DG.

In each of triangles JDM and LDN, the width JM equals LN times DE/DG.

Thus, since DE/DG is a constant, it may be indicated as such by $k$. Then, $v = $ GP$k$, the height FJ of the object 41 equals GK$k$ and the width JM of the object 41 equals LN$k$.

When the FJ dimension is measured by the arrangement of FIG. 3, the second camera drive 52 of the second camera control 51 is driven to zero. The camera 42 is rotated by means of the first camera drive 46 of the first camera control 45 until the image of the point F corresponds to or is in alignment with the hairline provided on the viewing screen of the monitor 43, and the first counter 48 and the second counter 54 are reset to zero. The camera 42 is then rotated by the second camera drive 52 until the image of the point J is in alignment with the hairline on the viewing screen of the monitor 43. The camera 42 is then rotated by the first camera drive 46 until the image of point M is in alignment with the hairline on the viewing screen of the monitor 43. At this point, the dimensions of width JM and height FJ may be read directly on the respective first and second counters 48 and 54 and recorded respectively by the first and second recorders 49 and 55.

Figure 4:
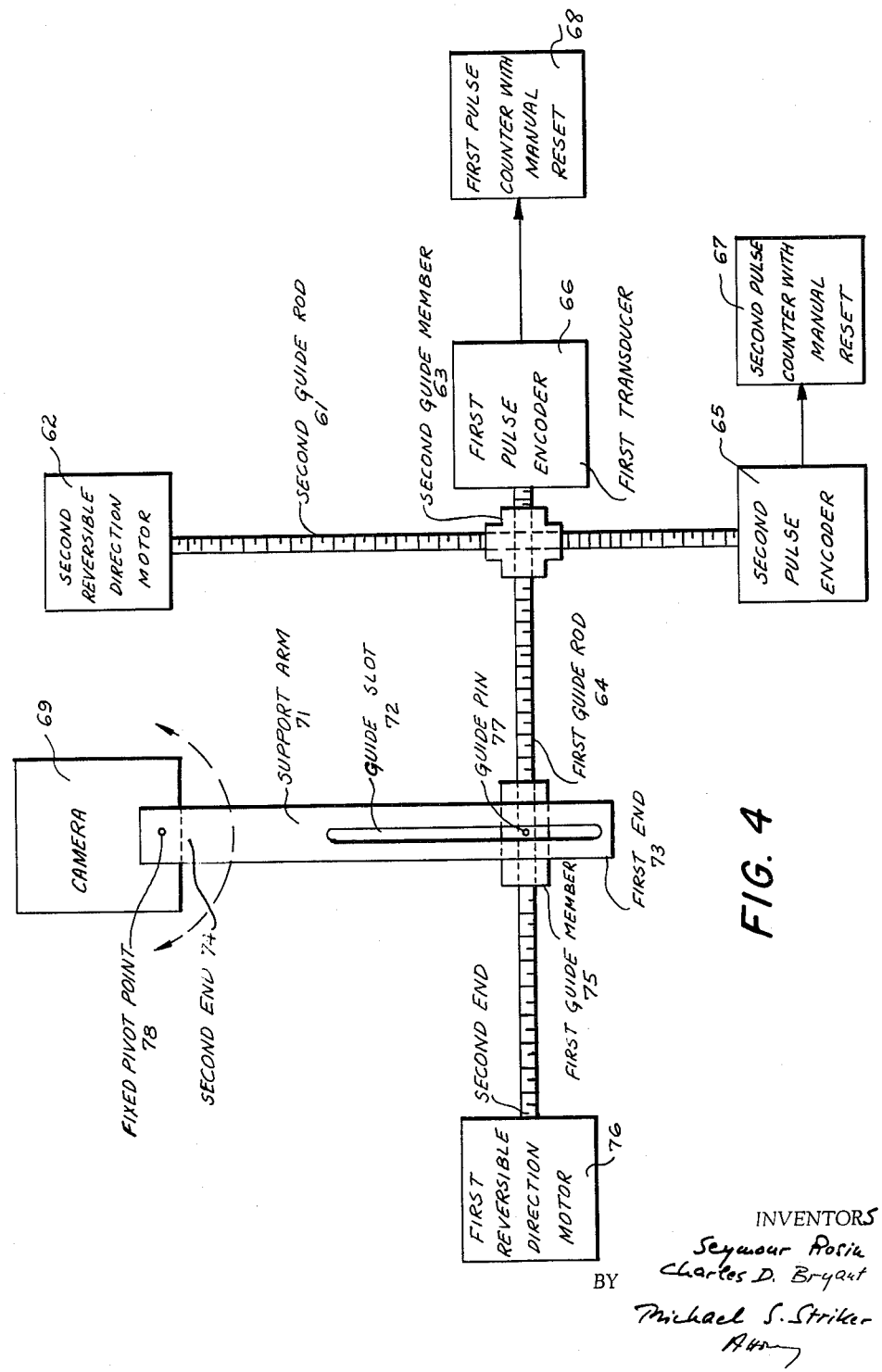
FIG. 4 is a schematic block diagram of camera controls which may be utilized as the first and second camera controls of the modification of FIG. 3.

FIG. 4 is a schematic diagram of camera control apparatus, which may be utilized with the embodiment of the dimension measuring arrangement of FIG. 3. The arrangement of FIG. 4 is similar to that of FIG. 2, with the exception that the entire system of FIG. 2 is mounted on a second guide rod 61 for movement in an axial direction thereof. In FIG. 4, the second guide rod 61 is rotated in either clockwise or counterclockwise direction by a second reversible direction motor 62. A second guide member 63 is coaxially mounted on the second guide rod 61 in threaded engagement therewith so that upon rotation of said second guide rod said second guide member moves in an axial direction along said second guide rod. The second guide member 63 carries the first guide rod 64 so that the entire first guide rod 64 and all the apparatus supported thereon and thereby is moved in accordance with the movement of said second guide member when the second guide rod 61 is rotated by the second motor 62. The number of revolutions of the second guide rod 61 is measured by a second transducer or pulse encoder 65 which is affixed or coupled to the opposite end of said second guide rod from that to which the second motor 62 is coupled. The second transducer 65 functions in the same manner as the first transducer 66 which is the same as the transducer 35 of FIG. 2. A second pulse counter 67 having manual reset connected to the output of the second transducer 65 functions in the same manner as the first pulse counter 68 which is connected to the output of the first transducer 66 and which is identical with the pulse counter 36 of FIG. 2. The camera 69, which is identical with the camera 22 of FIG. 2, is mounted on a support arm 71 having a longitudinally extending guide slot 72 formed therein in the area of the first end 73 of said arm, the camera 69 being supported by said support arm in the area of the second end 74 of said support arm. A first guide member 75 is coaxially mounted on the first guide rod 64 and moves in an axial direction of said first guide rod upon rotation of said first guide rod by the first reversible direction motor 76. A guide pin 77 affixed to and extending from the first guide member 75 through the guide slot 72 of the support arm 71 insures that rotation of the first guide rod 64 moves the first guide member 75 in an axial direction of said first guide rod and through said guide pin 77 rotates said camera 69 about the fixed pivot point 78. The components 64, 66, 68, 69, 71, 72, 73, 74, 75, 76, 77, 78 are all identical with the corresponding components of FIG. 2.

The arrangement of FIG. 4 functions in the same manner as the arrangement of FIG. 2, with the exception that the entire arrangement of FIG. 2 is moved in a direction substantially perpendicular to that of the first guide rod 64. The arrangement of FIG. 4 is thus utilized to provide two-dimensional scanning of the object 41 of FIG. 3 and functions to permit scanning in the direction FJ to determine the height of the object 41 and in the direction JM to determine the width of said object. The entire camera support arm and first guide member arrangement is moved in the axial direction of the second guide rod 61 and the length of such movement is determined by the second transducer 65 and the second pulse counter 67. This enables the accurate determination of the substantially perpendicular dimensions FJ and JM of the object 41 to be measured.

Utilization of the arrangement comprising the components 64, 66, 68, 69, 71, 72, 73, 74, 75, 76, 77 and 78, permits one dimension, such as the width JM of the object 41 to be measured. The combination of the aforementioned arrangement with the arrangement comprising the components 61, 62, 63, 65 and 67, however, enables the measurement of the height dimension FJ by enabling the entire first apparatus to be moved in the direction perpendicular to that required for the measurement of the width dimension.

Figure 5:
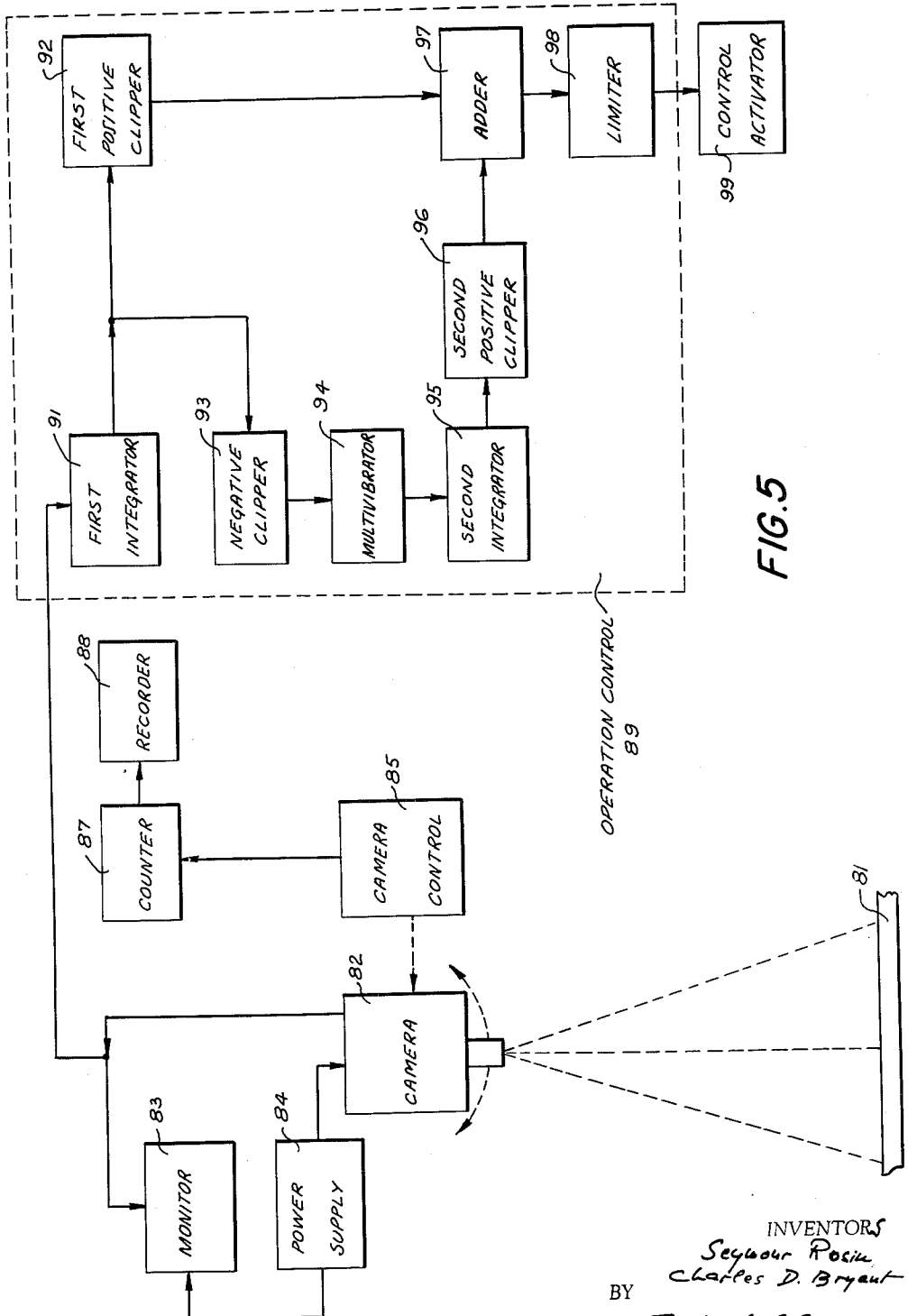
FIG. 5 is a schematic block diagram of another embodiment of the dimension measuring arrangement of the present invention for measuring any selected distance along a selected dimension of an object from a reference point in the selected dimension and for automatically controlling an operation on the object.

FIG. 5 is another embodiment of the dimension measuring arrangement of the present invention for measuring any selected distance along a selected dimension of an object from a reference point in the selected dimension and for automatically controlling an operation on the object. Thus, where the object 81, for example, is a hot ingot or beam or is a radioactive object which it is desired to cut or shear or to perform some other function or operation upon at a specific point, the arrangement of FIG. 5 is utilized. The control of an operation is that which enables the operation to be performed or which prevents the operation from being performed. Thus, the ingot, sheet or beam member 81 may be cut, marked, or treated in any manner automatically at a predetermined point along a selected dimension of said member 81 in accordance with the arrangement of FIG. 5.

A television camera 82 is positioned in operative proximity to the object 81 and produces a signal output which is fed to a television monitor 83 which receives the signal output of the camera and provides on its viewing screen a visual indication of the object seen by the camera 82. The camera 82 may comprise any suitable video camera such as, for example, the Fairchild-Dumont TC–100 camera produced by the Dumont Laboratories Division of the Fairchild Camera and Instrument Company. The camera 82 and the monitor 83 are energized by any suitable power supply 84 which is electrically connected to them. The camera 82 is driven by a camera control 85 which is identical with and functions in the same manner as the camera control 14 of FIG. 1. The camera control 85 provides an output to a counter 87 which is connected to the output of the camera control 85. A recorder 88 is connected to the output of the counter 87. The units 82, 83, 84, 85, 87 and 88 are identical with and function in the same manner as the corresponding units 11, 13, 21, 14, 17, 18 and 19 of FIG. 1 to provide a dimensional measurement.

In accordance with the automatic control feature of the arrangement of FIG. 5, however, the output signal produced by the camera 82 is utilized to perform a control operation. That is, the signal output of the television camera 82 is utilized to control an operation in accordance with a selected measured dimension of the object 81. The signal output of the television camera 82 includes a blanking pulse and a control pulse having a time duration proportional at any instant to the linear distance on said object of the selected dimension of the object from the reference point. The indication of the counter 87 and/or recorder 88 thus is that of the distance travelled by the moving image of the object 81 along the selected dimension of said object from the reference point of said object and thereby indicates any selected distance along the selected dimension of the object from the reference point. The camera control 85 and counter 87 thus comprise means for converting the motion of the camera 82 into a signal which is directly proportional at any instant to the linear distance of the image along the selected dimension of the object from the reference point of the object and is therefore directly proportional at any instant to the linear distance of the selected dimension of the object from the reference point of the object as discussed with reference to the description of FIG. 1.

The output signal or signal output of the television camera 82 is supplied to an operation control arrangement 89. The operation control 89 comprises a first integrator 91, a first positive clipper 92, a negative clipper 93, a multivibrator 94, a second integrator 95, a second positive clipper 96, an adder 97 and a limiter 98. The signal output of the television camera 82, which comprises a blanking pulse and a video signal, is supplied to the first integrator 91 of the operation control 89. The first integrator 91 functions to convert the blanking pulse and the video signal of the output signal of the television camera 82 to corresponding spikes and further functions to invert said spikes so that the said spikes produced by said first integrator include positive polarity spikes corresponding to the blanking pulse of the output signal of said camera and negative polarity spikes corresponding to the video signal of the output signal of said camera. The spikes produced by the first integrator 91 are supplied to the first positive clipper 92 which is connected to said first integrator. The first positive clipper 92 clips the positive polarity spikes produced by the first integrator 91 so that only negative polarity spikes are passed by said first positive clipper. The spikes produced by the first integrator 91 are supplied to the negative clipper 93, which is connected to said first integrator and which clips the negative polarity spikes produced by said first integrator. Thus, the negative clipper 93 passes only the positive polarity spikes present at the output of the first integrator 91.

The output of the negative clipper 93 is a positive polarity spike or pulse which occurs at the end of the camera blanking which is applied to and utilized to trigger the multivibrator 94, which is connected to the output of said negative clipper and which functions to convert the positive polarity spikes passed by said negative clipper to a reference pulse having a duration of predetermined magnitude. The multivibrator 94 is preferably a one-shot or monostable multivibrator having a period which is one half the active scanning time of a television line. The reference pulse produced by the multivibrator 94 is a substantially square wave pulse and is supplied to the second integrator 95. The second integrator 95, which is connected to the multivibrator 94, converts the square wave reference pulse produced by said multivibrator into a positive polarity spike and a negative polarity spike spaced from each other by a time equal to the reference pulse duration. That is, the output of the second integrator 95 is a positive spike and a negative spike separated from each other by the duration time of the substantially square wave reference pulse produced by the multivibrator 94.

The spikes produced by the second integrator 95 are supplied to a second positive clipper 96 connected to said second integrator 95. The second positive clipper 96 clips the positive polarity spike produced by the second integrator 95 and passes only the negative polarity spike produced thereby. The negative polarity pulse passed by the second positive clipper 96 occurs at a time corresponding to the midpoint of the entire scanning time. The output negative spike of the second positive clipper 96 and the output negative polarity spikes of the first positive clipper 92 are fed to the inputs of the adder 97 which adds together the spikes supplied to its inputs. The output of the adder 97 is the sum of the spikes fed into it from the first and second positive clippers 92 and 96, respectively.

If, the single negative polarity spike passed by the second positive clipper 96 is coincident in time relation (in phase) with the last (in time of occurrence) of the series of negative polarity spikes passed by the first positive clipper 92, the spike indicating the sum of the aforementioned spikes will be of greater magnitude than the magnitudes of the other spikes of the series of spikes passed by said first positive clipper. That is, if the reference spike provided by the second positive clipper 96 is coincident with the end spike of the series of spikes provided by the first positive clipper 92 then the last spike of the series produced by the adder 97 will be of greater amplitude than that of the other spikes of the series produced by said adder. If the reference spike is not coincident in time or in phase with the last spike of the series of spikes indicating the control pulse of the signal output of the camera 82, there will be no spike in the series produced by the adder 97 of greater amplitude than that of the other spikes of said series. Thus, the magnitude of the end spike of the series of spikes produced by the adder 97 indicates whether or not a control is available for an operation on the object 81. If it is desired to exercise such control, coincidence of such spikes would indicate that the object 81 has reached a certain or preselected dimension. At this point, the end pulse or spike of the series of spikes produced by the adder 97 will be of greater amplitude than that of the other spikes and will perform the control function. The greater amplitude spike or pulse is supplied to the limiter 98, which is connected to the output of the adder 97 and which limits the negative polarity spikes produced at the output of said adder to those spikes having an amplitude greater than a predetermined magnitude. The predetermined amplitude or magnitude is that of the plurality of negative polarity spikes in the series of spikes passed by the first positive clipper 92. Thus, only that spike, i.e., the spike indicating coincidence between the reference spike and the control spike, is passed by the limiter 98 and is supplied to a control actuator 99 which functions to initiate the actual operation, such as cutting, marking, or otherwise working on, the object 81.

It is thus seen that the control actuator 99 receives a control spike from the limiter 98 only upon coincidence in time between the reference spike and the control spike from the first positive clipper 92 thereby insuring the operation automatically at the selected point in the selected dimension of the object 81. Thus, for example, if it is desired to cut the object 81 at 36 feet, as in the aforementioned example, when the control pulse occurring at 36 feet is coincident with the reference pulse, the operation will occur. The incidence of the reference pulse is determined by adjustment of the multivibrator 94 to occur at a time corresponding to 36 feet of length of the object 81 form the initial reference point.

The first function of the control actuator 99 may be to stop the motion of the object 81, if said object is moving. This is the situation in cold or hot rolling mills and in most types of steel processing applications where the steel is moved on conveyor means from one stage of operation to another. In the embodiment of FIG. 5, the object 81 may be stopped at the desired length at which the initial reference pulse setting is made. The waveform of the input signal to the monitor 83 shows the signal output of the camera 82 when the object 81 has reached the center of the picture shown on the viewing screen of said monitor, and as the said object moves along the roller bed to the predetermined point the signal output of said camera is integrated by the first integrator 91 of the operation control 89 to provide the required pulse output.

The negative polarity pulse passed by the second positive clipper 96 may be supplied to the grid of the cathode ray tube of the monitor 83 to provide the vertical hairline on the image viewing screen. The first and second integrator circuits and the first and second positive clippers, the negative clipper, the multivibrator, the adder and the limiter may comprise any suitable circuit arrangements known in the art for performing the function set forth for each of these circuits. Thus, for example, any suitable integrator circuit may be utilized as the first integrator 91 and as the second integrator 95. Any suitable positive clipper circuit may be utilized as the first positive clipper 92 and as the second positive clipper 96. Any suitable negative clipper circuit may be utilized as the negative clipper 93. Any suitable multivibrator arrangement may be utilized as the multivibrator 94, although said multivibrator preferably comprises a one-shot or monostable multivibrator. The multivibrator 94 is adjusted to produce its output reference pulse at a predetermined time which is indicative of the distance along the selected dimension of the object 81 at which the control function is to become effective. This may be adjusted in any suitable manner known in the art which adjusts the characteristics of such multivibrator circuit. The adder circuit 97 and the limiter circuit 98 comprise any suitable means known in the art for performing the adding and limiting function. The adder circuit 97 as a standard pulse adder which may comprise, for example, a double triode with a common plate load resistor and the limiter circuit 98 functions as an amplitude limiter which may comprise, for example, a biased diode.

The control actuator 99 may comprise any suitable means for converting a pulse to a means for initiating an operation or for terminating an operation. Thus, for example, the control actuator 99 may comprise a relay means controlled by a thyratron which receives a pulse to trigger it and to energize the relay. The relay may then open or close a circuit and the circuit may stop or start the movement of the object 81 along its roller bed or may stop or start a cutting, marking, painting or other type of operation.

The midpoint of the scanning time of the active scanning time of the television system is utilized as the time of occurrence of the reference pulse merely as a matter of convenience. Any suitable point along the active scanning time reference line of the television system may be utilized for the provision of the reference pulse. Thus, one-third, two-thirds, or any other length of the active scanning time of the system may be the point at which the reference pulse is made to appear. The multivibrator 94 must of course be adjusted to provide the reference pulse at such point. The purpose of the operation control 89 is to indicate coincidence in time between the reference pulse derived from the blanking pulse of the output signal of the camera 82, which is the fixed reference point, and the pulse passed by the first positive clipper 92 which is indicative of the length of the object 81. The reference pulse is of course provided at that point in the active scanning time at which the desired length of the object 81 will come into view at the hairline of the viewing screen of the monitor 83.

The operation control 89 of FIG. 5 thus provides an electronic hairline for the viewing screen of the monitor 83 and thus illustrates a method of controlling an operation through completely electronic means.

Figure 6:
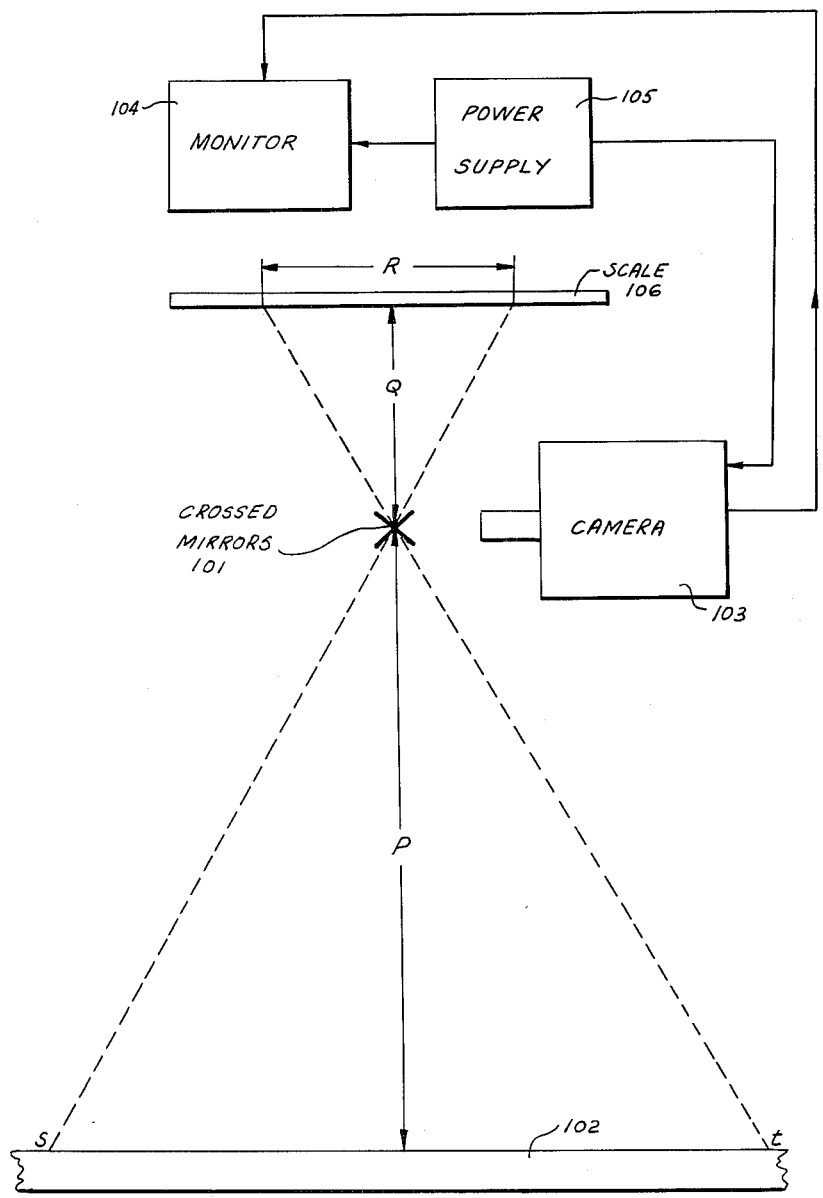
FIG. 6 is a schematic block diagram of another embodiment of the dimension measuring arrangement of the present invention.

FIG. 6 is another embodiment of the dimension measuring arrangement of the present invention. In FIG. 6, a crossed mirror unit 101 is utilized to provide scanning of an object 102 and to permit a television camera 103 to remain stationary. The television camera 103 is connected to a television monitor 104 which indicates on its viewing screen the image of the object seen by said camera. The power supply 105 energizes the television camera 103 and the television monitor 104, which are electrically connected thereto.

The embodiment of the dimension measuring arrangement of FIG. 6 is not as advantageous as those of FIGS. 1 to 5, as described hereinbefore, in that a lesser deflection of the line of sight of the camera 103 is obtainable with the cross mirror system 101 in FIG. 6 than that which is obtainable with the camera moving means of FIGS. 1 to 5. Furthermore, in the embodiment of FIG. 6, the dimension indication is purely visual, that is, it is indicated on the viewing screen of the monitor 104 itself. In the embodiment of FIG. 6, the television camera 103 is positioned in operative proximity to the object 102. The monitor 104 has a reference line or hairline provided on its viewing screen.

Figure 7:
FIG. 7 is a fragmentary view of an embodiment of a scale which may be utilized with the embodiment of FIG. 6.

A scale 106 is positioned in spaced relation to the object 102. The scale 106 has a reference point thereon and a plurality of markings thereon extending along its length at uniformly greater distances from the reference point thereof. Each of the markings on the scale is marked with a corresponding value number indicating its distance from the reference point on the scale. An embodiment of a scale which may be utilized with the embodiment of FIG. 6 is shown in FIG. 7, wherein any of the markings may be utilized as the reference point, although in the usual sense of the word the zero mark marking is utilized as the reference point; the magnitude indicated by the scale being read from said zero point.

Figure 8:
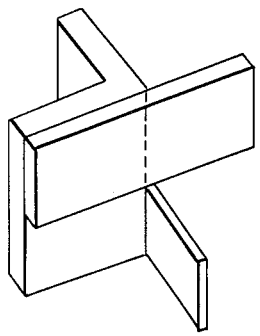
FIG. 8 is a perspective view of a mirror arrangement which may be utilized with the embodiment of FIG. 6.

The crossed mirror arrangement 101 may comprise any suitable type such as that shown in FIG. 8, wherein two mirrors are positioned at substantially 90° to each other. Thus, when said mirrors are rotatably mounted about their common axis, such as, for example, on a string or on a turntable, or on any suitable means, one mirror sees the scale 106 and the other mirror sees the object 102 and the images of said scale and of said object are both reflected into the camera 103. The crossed mirror system 101 is rotatably mounted in spaced relation from each of the scales 106 and the object 102 and said crossed mirror system is rotated in a scanning manner in such a way that the crossed mirrors reflect into the camera 103 a moving image of said object along the selected dimension of said object from the reference point of said object and simultaneously reflect into said camera a moving image of the scale 106, along the length of said scale from the reference point of said scale in a manner whereby when the reference point of said scale is initially aligned with the reference point of said object on the monitor viewing screen, the image of said scale indicates a value which corresponds at any instant to the linear distance of the image of said object along the selected dimension of said object from the reference point of said object and therefore corresponds at any instant to the linear distance of the selected dimension of said object from the reference point of said object.

It is thus seen, that the crossed mirror system 101 reflects the image of the scale 106 and that of the object 102 into the camera 103. Of course, any suitable optical system necessary for insuring that this will occur may be provided between the crossed mirror system 101 and the camera 103. The rotation of the crossed mirror system 101 about the common axis of the substantially perpendicular mirrors thereof moves the line of sight of the camera 103 from a point $s$, which is the reference point of the selected dimension to be measured of the object 102, to a point $t$ in said selected dimension. If the scale indication at the hairline on the viewing screen of the monitor 104 is noted at each of the points s and t of the image of the object 102 as it passes along said screen, the distance between the points s and t is equal to $RP/Q$; R being the distance along the scale 106 scanned by the crossed mirror system 101, P being the distance between said crossed mirror system and said object, and Q being the distance between said crossed mirror system and said scale.

If the reference point s is a zero reference point, such as, for example, the cutting face of a shear, and if the scale 106 is printed with markings calibrated to the scale factor $P/Q$, a direct measurement for setting to lengths to be cut by the shear may be accomplished by setting the hairline on the viewing screen of the monitor to the desired length marking on the scale, by rotating the crossed mirror system and then running the object 102 along its roller bed or other conveyor means until the image of the end of said object on said monitor corresponds with said hairline.

Figure 9:
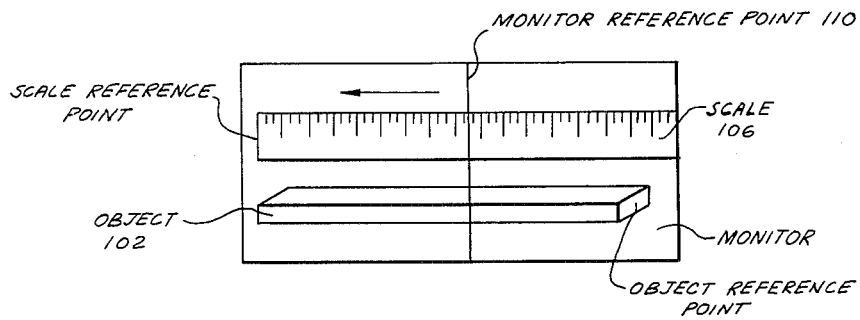
FIG. 9 is a view of the presentation of the monitor viewing screen during operation of the embodiment of FIG. 6.

FIG. 9 indicates what may be seen on the viewing screen of the television monitor 104 during the operation of the dimension measuring arrangement of FIG. 6. The left end of the scale 106 conforms to the right end of the object 102. The crossed mirror system 101 is then rotated in a clockwise direction and the line of sight is thus moved from left to right on the scale 106 and from right to left on the object 102. Thus, the initial position of the object 102 and the scale 106 is for the reference point of said object to be aligned with the zero reference point of said scale 106 at the monitor reference point or hairline 110. The crossed mirror system 101 is then rotated until the desired length or other dimension of the object 102 has been run off and the length is then indicated on the scale 106. This is due to the fact that the scale 106 will continuously indicate the length or other selected dimension of the object 102 which is seen by the camera 103. Thus, for example, if a 20 foot length is desired to be cut off the object 102, both the scale 106 and said object are started at a zero reference point in alignment with the monitor reference point 110. The crossed mirror arrangement 101 is then rotated, and when the 20-foot scale marking coincides with the monitor reference point 110, the operator stops the motion of the object 102 and the point of stoppage is the 20-foot mark from the initial reference point. An operation such as cutting, marking, or other similar operation, is then performed on the object 102.

Figure 10:
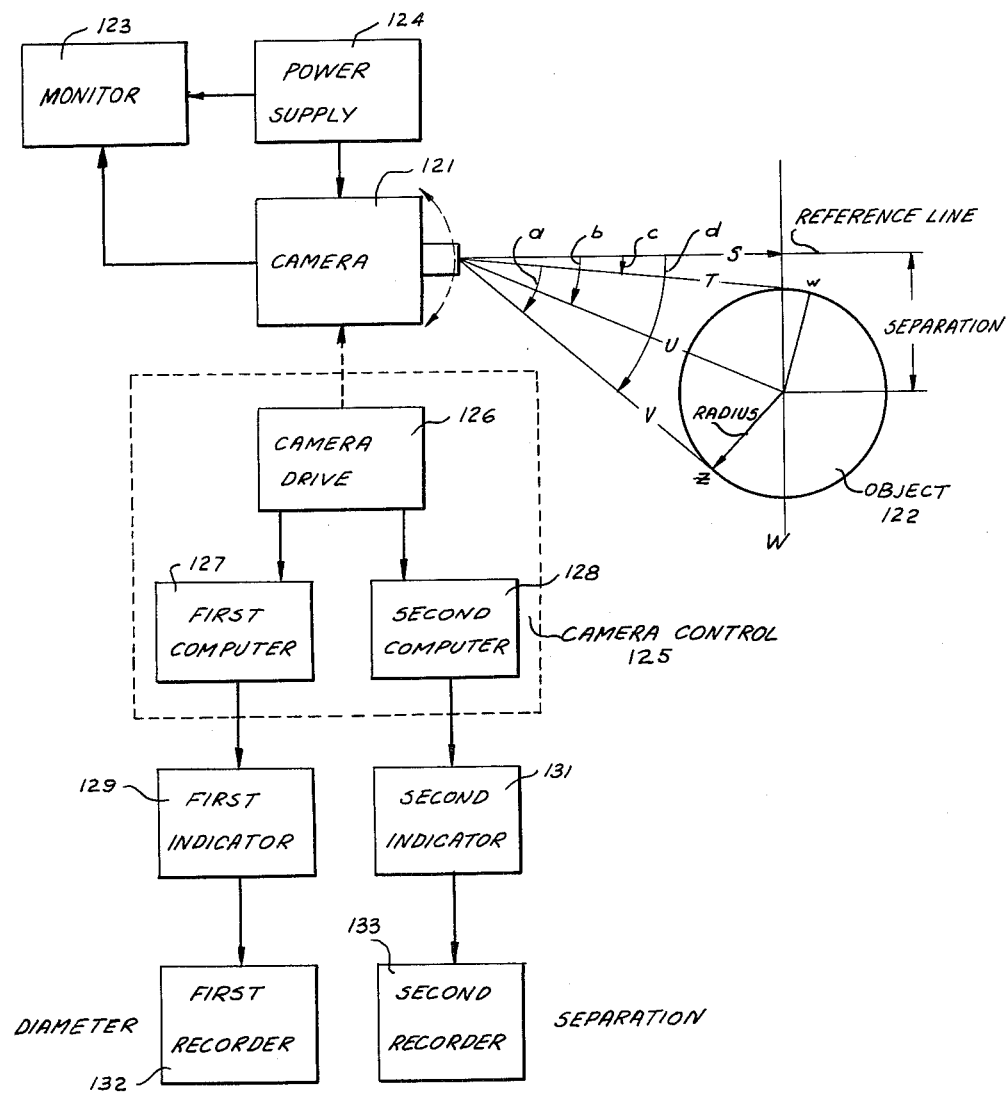
FIG. 10 is a schematic block diagram of another embodiment of the dimension measuring arrangement of the present invention for measuring the diameter of an object having an arcuate surface and a circular cross-section formed by the arcuate surface.

FIG. 10 is another embodiment of the dimension measuring arrangement of the present invention. The dimension measuring arrangement of FIG. 10 measures the diameter of an object having an arcuate surface and a circular cross-section formed by the arcuate surface. A television camera 121 is positioned in operative proximity to an object 122. The object 122 is shown in cross-section, or from an end thereto, and is seen to have a circular cross-section formed by its arcuate surface. A television monitor 123 is connected to the output of the television camera 121 and provides on the viewing screen of said monitor a visual indication of an object seen by said camera. The power supply 124 energizes the camera 121 and the monitor 123. The television camera 121 is mounted for pivotal movement about a fixed pivot point. The television camera 121 may be mounted in any suitable manner to permit pivotal movement thereof about a fixed pivot point.

A camera control 125 comprising a camera drive 126, a first computer 127 and a second computer 128, controls the movement of the camera 121 about the fixed pivot point. The camera drive 126 rotates the camera 121 about the fixed pivot point in a manner whereby the object 122 is scanned along the arcuate surface thereof. The camera drive 126 includes a transducer which is mechanically coupled to the camera drive and which converts the mechanical rotation of the camera 121 to an electrical signal proportional at any instant to the angle of movement of said camera from a predetermined reference line S.

The first computer 127 and the second computer 128 are coupled to the output of the camera drive 126. The first computer 127, coupled to the transducer of the camera drive 126, solves the trigonometric equation $2S$ secant $b$ sine $a/2$ wherein S is the distance along the axis of the camera 121 through the center of rotation of said camera to a line W perpendicular to the axis of the camera and extending through the center of the circular cross-section of the object 122 and perpendicular to the axis of said object, $b$ is the angle of movement of the camera 121 from the axis S of said camera to a line U extending from the center of the lens of said camera to the point of intersection of the line W, perpendicular to the axis of said camera and the axis of said object with the center of the circular-cross-section of said object, and $a$ is the angle of movement of the camera 121 from a first tangent line T extending from the center of the lens of said camera and tangential to the arcuate surface of said object at a point $w$ to a second tangent line V extending from the center of the lens of said camera and tangential to the arcuate surface of said object at a point $z$ spaced from the point $w$ of intersection of said first tangent line and said object.

The first computer 127 produces an output signal having a magnitude corresponding to the magnitude of the diameter of the object 122, the diameter of said object being twice the radial distance of said cross-section of said object. A first indicator 129 is connected to the output of the first computer 127 and represents the output signal of said computer as the magnitude of the diameter of the object 122. A first recorder 132 is connected to the first indicator for recording the magnitude indicated by said first indicator.

The second computer 128, coupled to the transducer of the camera drive 126, solves the trigonometric equation $S$ tangent $b$ wherein S and $b$ have the same values as in the first-mentioned trigonometric equation. Thus, the second computer 128 produces an output signal having a magnitude corresponding to the magnitude of the separation of the center of the circular cross-section of the object 122 from the reference line S. A second indicator 131 is connected to the output of the second computer 128 and represents the output signal of said computer as the magnitude of the separation of the center of the cross-section of the object 122 from the reference line S. A second recorder 133 is connected to the second indicator 131 and provides a recording of the magnitude indicated by the second indicator 131.

The object 122 may comprise any object of circular cross-sectional area such as, for example, a large cylindrical object or tube of any type. The trigonometric equations solved by the computers 127 and 128 are derived in the following manner:

The angle $d$ equals the angle $b$ plus the angle $a/2$ and the angle $c$ equals the angle $b$ minus the angle $a/2$.

It follows that the angle $b$ equals the angle $d$ plus the angle $c$ divided by 2 and the angle $a/2$ equals the angle $d$ minus the angle $c$ divided by 2.

From FIGURE 10 it follows that the radius of the cross-sectional area of the object 122 equals U sine $a/2$ and the distance U equals S secant $b$.

The diameter of the cross-sectional area of the object 122 is equal to two times the radius, and therefore equals $2s$ secant b sine $a/2$.

The distance or separation of the cross-sectional area of the object 122 from the axial center line of the camera 121 or from the reference line S of said camera is indicated by the value S tangent $b$.

In operation, the camera 121 is rotated by means of the camera drive 126 until the hairline on the viewing screen of the monitor 123 corresponds with the images of the tangent points $w$ and $z$ successively. At each of the points $w$ and $z$, which indicate the point of contact between the tangent lines T and V and the arcuate surface of the object 122, position information is fed to the first and second computers 127 and 128 which then compute the diameter and separation distance of said object by means of the aforementioned equations.

The camera control apparatus 125 of the embodiment of FIG. 10 may comprise any suitable means for performing the functions set forth. Such suitable means may comprise servo control systems of types well known in the art, including angle indicating means which equate the mechanical position or the mechanical rotation of the camera to an electrical signal indicative of the angle of rotation thereof. Suitable camera control apparatus 125 may comprise, for example, a system such as that shown in FIG. 11.

FIG. 11 is an embodiment of a camera control apparatus which may be utilized with the embodiment of the dimension measuring arrangement of FIG. 10. In FIG. 11, a switch 141 is initially set to its lower position and the diameter crank 142 is manually rotated until the lower edge of the diameter being measured coincides with the diametrical crosshair or reference line on the television monitor viewing screen. During this operation, an electromagnetic clutch 143 is disengaged so that the sine potentiometer 144 is kept at its zero position by means of a spring coupled to its wiper shaft.

The electromagnetic clutch 143, the sine potentiometer 144 and the differential, as well as each of the potentiometers, servo motors, synchro-transformers, synchro transmitters and servo amplifiers, are well known apparatus and are therefore not described herein, since each may be readily purchased as an individual unit. The $b$ shaft is driven through the angle $d$ during operation. The switch 141 is then turned to its upper position and thereby actuates the clutch 143 to connect the $a/2$ and the $b$ shafts through a 2:1 gear ratio. The diameter crank 142 is then rotated until the upper edge of the diameter being measured coincides with the diameter crosshair on the monitor screen. During this operation, the top input to the mechanical differential is driven through the angle $a$ while the right hand input is driven through the angle $a/2$. Directions are selected so that the resulting motion of the $b$ shaft becomes $d$ minus $a/2$ or $b$. The 1:2 gear ratio shown on the differential output merely corrects for the normal 2:1 gear ratio in the differential. A synchro transmitter 145 coupled to the hand crank 142 is electrically connected to a synchro transformer 146 on the camera drive. A servomotor 147 drives the camera 121 to a position which accurately corresponds to the potentiometer shafts in the computer. A second servo motor 148 in the computer housing drives a counter 149 to correspond with the function 2S sine $a/2$ secant $b$, or the diameter of the object.

All angles are measured from a fixed reference line S, as indicated in FIG. 10. However, the camera 121 does not have to be returned to the fixed reference line of sight before the next measurement is made. If the switch 141 is moved to the lower position after completing a measurement, the clutch 143 is released and the spring returns the sine potentiometer 144 to zero and through the right hand input to the differential 151 realigns the $b$ shaft with the position of the camera 121. It is important to note that when the switch 141 is in its lower position, the stored $b$ indication is coincident with $d$ so that lining up the bottom of another object's diameter with the crosshair on the monitor screen will then move the $b$ shaft to correspond to a new angle $d$ with reference to the reference line S so that no separate zero setting mechanism is required.

A second servo motor 152 drives a counter 153 in accordance with the function S tangent $b$ or the value of the separtion of the center of the cross-sectional area of the object 122 from the reference line S.

A third servo loop may be provided to traverse the camera 121 along a track to observe the object 122 at various points throughout its length. This comprises a hand crank 154, a counter 155, a synchro transmitter 156 mounted in the computer box, a servo motor 157 and a synchro transformer 158 at the camera 121 to reproduce the transversal set in by the operator.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What we claim is:

1. A dimension measuring arrangement for measuring any selected distance along a selected linear dimension of an object from a reference point common to an arcuate dimension corresponding to said selected linear dimension and said selected linear dimension comprising, in combination, a television camera positioned in operative proximity to said object; a television monitor arrangement connected to said camera and adapted to provide a visual indication of an object seen by said camera; moving means for providing in said camera and thereby in said monitor a moving image of said object along said arcuate dimension of said object from the reference point of said object, said moving means comprising means for pivotally moving said camera in scanning manner along said arcuate dimension of said object from the reference point of said object; and indicating means for providing an indication of the distance travelled by the moving image of said object along said arcuate dimension of said object from the reference point of said object thereby indicating any selected distance along said arcuate dimension of said object from said reference point, said indicating means comprising means for converting motion of said camera into a signal which is directly proportional at any instant to the angular displacement of said camera from the reference point of said object and is therefore adapted to be converted to a signal which is proportional at any instant to the linear distance of said selected linear dimension of said object from said reference point of said object.

2. A dimension measuring arrangement for measuring the diameter of an object having an arcuate surface and a circular cross-section formed by said arcuate surface comprising, in combination, a television camera positioned in operative proximity to said object; a television monitor arrangement connected to said camera and adapted to provide a visual indication of an object seen by said camera; mounting means mounting said camera for pivotal movement about a fixed pivot point; driving means for rotating said camera about said fixed pivot point thereby to scan said object along the arcuate surface of said object; transducer means coupled to said driving means for converting the mechanical rotation of said camera to an electrical signal proportional at any instant to the angle of movement of said camera from a predetermined reference line; computing means coupled to said transducer means for solving a selected trigonometric equation consisting of selected components having predetermined values and having other values depending upon selected trigonometric functions of the angles of movement of said camera from said reference line to other preselected reference lines related to said object to said camera, said computing means producing an output signal having a magnitude corresponding to the magnitude of the diameter of said object; indicating means coupled to said computing means for representing the output signal of said computing means as the magnitude of the diameter of said object; and recording means connected to said indicating means for recording the magnitude indicated by said indicating means.

3. A dimension measuring arrangement for measuring the diameter of an object having an arcuate surface and a circular cross-section formed by said arcuate surface comprising, in combination, a television camera positioned in operative proximity to said object, said camera having a lens and an axis entending through said camera and substantially perpendicularly through the center of the lens thereof; a television monitor arrangement connected to said camera and adapted to provide a visual indication of an object seen by said camera; mounting means mounting said camera for pivotal movement about a fixed pivot point; driving means for rotating said camera about said fixed pivot point thereby to scan said object along the arcuate surface of said object; transducer means coupled to said driving means for converting the mechanical rotation of said camera to an electrical signal proportional at any instant to the angle of movement of said camera from a predetermined reference line; computing means coupled to said transducer means for solving a selected trigonometric equation 2 S secant $b$ sine $a/2$ wherein S is the distance along the axis of said camera from the lens of said camera to a line perpendicular to said axis of said camera and extending through the center of the circular cross-section of said object and perpendicular to the axis of said object, $b$ is the angle of movement of said camera from said axis of said camera to a line extending from the center of the lens of said camera to the point of intersection of said line perpendicular to said axis of said camera and said center of said circular cross-section of said object, and $a$ is the angle of movement of said camera from a first tangent line extending from the center of the lens of said camera and tangential to the arcuate surface of said object to a second tangent line extending from the center of the lens of said camera and tangential to the arcuate surface of said object at a point spaced from the point of intersection of said first tangent line and said object, said computing means producing an output signal having a magnitude corresponding to the magnitude of the diameter of said object; indicating means coupled to said computing means for representing the output signal of said computing means as the magnitude of the diameter of said object; and recording means connected to said indicating means for recording the magnitude indicated by said indicating means.

4. A dimension measuring arrangement for measuring the diameter of an object having an arcuate surface and a circular cross-section formed by said arcuate surface comprising, in combination, a television camera positioned in operative proximity to said object; a television monitor arrangement connected to said camera and adapted to provide a visual indication of an object seen by said camera; mounting means mounting said camera for pivotal movement about a fixed pivot point; driving means for rotating said camera about said fixed pivot point thereby to scan said object along the arcuate surface of said object; transducer means coupled to said driving means for converting the mechanical rotation of said camera to an electrical signal proportional at any instant to the angle of movement of said camera from a predetermined reference line; first computing means coupled to said transducer means for solving a first selected trigonometric equation consisting of selected components having predetermined values and having other values depending upon selected trigonometric functions of the angles of said camera from said reference line to other preselected reference lines related to said object and to said camera, said first computing means producing an output signal having a magnitude corresponding to the magnitude of the diameter of said object; second computing means coupled to said transducer means for solving a second selected trigonometric equation consisting of selected components having predetermined values and having other values depending upon selected trigonometric functions of the angles of said camera from one of said other preselected reference lines to another of said other preselected reference lines, said second computing means producing an output signal having a magnitude corresponding to the separation of the center of said object from said reference line; first indicating means coupled to said first computing means for representing the output signal of said first computing means as the magnitude of the diameter of said object; second indicating means coupled to said second computing means for representing the output signal of said second computing means as the magnitude of the separation of the center of said object from said reference line; first recording means connected to said first indicating means for recording the magnitude indicated by said first indicating means; and second recording means connected to said second indicating means for recording the magnitude indicated by said second indicating means.

5. A dimension measuring arrangement for measuring the diameter of an object having an arcuate surface and a circular cross-section formed by said arcuate surface comprising, in combination, a television camera positioned in operative proximity to said object, said camera having a lens and an axis extending through said camera and substantially perpendicularly through the center of the lens thereof; a television monitor arrangement connected to said camera and adapted to provide a visual indication of an object seen by said camera; mounting means mounting said camera for pivotal movement about a fixed pivot point; driving means for rotating said camera about said fixed pivot point thereby to scan said object along the arcuate surface of said object; transducer means coupled to said driving means for converting the mechanical rotation of said camera to an electrical signal proportional at any instant to the angle of movement of said camera from a predetermined reference line; first computing means coupled to said transducer means for solving a selected trigonometric equation $2S$ secant $b$ sine $a/2$ wherein S is the distance along the axis of said camera from the lens of said camera to a line perpendicular to said axis of said camera and extending through the center of the circular cross-section of said object and perpendicular to the axis of said object, $b$ is the angle of movement of said camera from said axis of said camera to a line extending from the center of the lens of said camera to the point of intersection of said line perpendicular to said axis of said camera and said center of said circular cross-section of said object, and $a$ is the angle of movement of said camera from a first tangent line extending from the center of the lens of said camera and tangential to the arcuate surface of said object to a second tangent line extending from the center of the lens of said camera and tangential to the arcuate surface of said object at a point spaced from the point of intersection of said first tangent line and said object, said first computing means producing an output signal having a magnitude corresponding to the magnitude of the diameter of said object; second computing means coupled to said transducer means for solving a selected trigonometric equation S tangent $b$ wherein S is the distance along the axis of said camera from the lens of said camera to a line perpendicular to said axis of said camera and extending through the center of the circular cross-section of said object and perpendicular to the axis of said object, $b$ is the angle of movement of said camera from said axis of said camera to a line extending from the center of the lens of said camera to the point of intersection of said line perpendicular to said axis of said camera and said center of said circular cross-section of said object, said second computing means producing an output signal having a magnitude corresponding to the magnitude of the separation of the center of the circular cross-section of said object from said reference line; first indicating means coupled to said first computing means for representing the output signal of said first computing means as the magnitude of the diameter of said object; second indicating means coupled to said second computing means for representing the output signal of said second computing means as the magnitude of the separation of said object from said reference line; first recording means connected to said first indicating means for recording the magnitude indicated by said first indicating means; and second recording means connected to said second indicating means for recording the magnitude indicated by said second indicating means.

6. The method of measuring the diameter of an object having an arcuate surface and a circular cross-section formed by said arcuate surface, comprising the steps of positioning a television camera in operative proximity to said object; connecting a television monitor arrangement to said camera to provide a visual indication of an object seen by said camera; mounting said camera for pivotal movement about a fixed pivot point; rotating said camera about said fixed pivot point thereby to scan said object along the arcuate surface of said object; converting the mechanical rotation of said camera to an electrical signal proportional at any instant to the angle of movement of said camera from a predetermined reference line; solving a selected trigonometric equation consisting of selected components having predetermined values and having other values depending upon selected trigonometric functions of the angles of movement of said camera from said reference line to other preselected reference lines related to said object and to said camera and producing an output signals having a magnitude corresponding to the magnitude of the diameter of said object; representing said output signal as the magnitude of the diameter of said object; and recording said represented magnitude.

References Cited by the Examiner

UNITED STATES PATENTS

| | | | |
|---|---|---|---|
| 2,298,476 | 10/1942 | Goldsmith | 178—6 |
| 2,954,427 | 9/1960 | Covely et al. | 178—6.8 |
| 2,956,117 | 10/1960 | Ernst et al. | 178—6.8 |
| 2,972,141 | 2/1961 | Barlow | 178—6.8 |
| 3,033,923 | 5/1962 | Stocker | 178—6.8 |

MALCOLM A. MORRISON, *Primary Examiner.*

DARYL W. COOK, *Examiner.*